(12) United States Patent
Lambert (10) Patent No.: US 8,990,564 B2
(45) Date of Patent: Mar. 24, 2015

(54) SYSTEM AND METHOD FOR PERFORMING DEVICE AUTHENTICATION USING KEY AGREEMENT

(75) Inventor: Robert John Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 313 days.

(21) Appl. No.: 13/176,897

(22) Filed: Jul. 6, 2011

(65) Prior Publication Data

US 2012/0011362 A1    Jan. 12, 2012

Related U.S. Application Data

(60) Provisional application No. 61/362,604, filed on Jul. 8, 2010.

(51) Int. Cl.
| | |
|---|---|
| *H04L 9/32* | (2006.01) |
| *G06F 21/34* | (2013.01) |
| *H04L 9/08* | (2006.01) |
| *G06F 21/44* | (2013.01) |
| *H04L 9/30* | (2006.01) |

(52) U.S. Cl.
CPC .............. *H04L 9/0844* (2013.01); *G06F 21/34* (2013.01); *G06F 21/44* (2013.01); *H04L 9/3066* (2013.01); *H04L 9/3242* (2013.01)
USPC ........................................................ 713/168

(58) Field of Classification Search
None
See application file for complete search history.

(56) References Cited

U.S. PATENT DOCUMENTS

| | | | |
|---|---|---|---|
| 6,510,517 B1 * | 1/2003 | Bruhnke et al. ............... | 713/168 |
| 6,563,928 B1 | 5/2003 | Vanstone et al. | |
| 7,007,164 B1 * | 2/2006 | Euchner ......................... | 713/168 |
| 7,123,721 B2 * | 10/2006 | Panjwani et al. .............. | 380/270 |
| 8,074,078 B2 * | 12/2011 | Brown et al. .................. | 713/193 |
| 8,639,931 B2 * | 1/2014 | Brown ........................... | 713/171 |
| 8,751,806 B1 * | 6/2014 | Adler et al. .................... | 713/168 |
| 2001/0014153 A1 * | 8/2001 | Johnson .......................... | 380/30 |
| 2003/0065918 A1 | 4/2003 | Willey | |
| 2004/0114760 A1 * | 6/2004 | Brown et al. .................. | 380/255 |
| 2006/0029220 A1 | 2/2006 | Ibrahim | |
| 2006/0029222 A1 | 2/2006 | Lambert et al. | |
| 2006/0153366 A1 | 7/2006 | Beeson | |
| 2007/0033405 A1 * | 2/2007 | Menezes ........................ | 713/171 |
| 2007/0110234 A1 * | 5/2007 | Lambert et al. ................ | 380/44 |
| 2008/0263672 A1 | 10/2008 | Chen et al. | |
| 2009/0327713 A1 * | 12/2009 | Marin et al. ................... | 713/168 |

(Continued)

FOREIGN PATENT DOCUMENTS

| | | |
|---|---|---|
| EP | 2124382 A1 * | 11/2009 |
| WO | WO 2009/056048 A1 | 5/2009 |
| WO | WO 2009141187 A1 * | 11/2009 |

OTHER PUBLICATIONS

Infineon ORIGA™—Original Product Authentication and Brand Protection Solution—SLE 95050; http://www.infineon.com/cms/en/product/promopages/origa/ORIGA.pdf; publication date unknown.

(Continued)

*Primary Examiner* — Michael R Vaughan
(74) *Attorney, Agent, or Firm* — Fleit Gibbons Gutman Bongini & Bianco P.L.

(57) ABSTRACT

A system and method are provided which employs a key agreement scheme, wherein the agreed-upon-shared key is used in a protocol message in the authentication rather than being employed as a session key.

23 Claims, 9 Drawing Sheets

(56) References Cited

U.S. PATENT DOCUMENTS

| | | | | |
|---|---|---|---|---|
| 2010/0172493 | A1* | 7/2010 | Georgiades et al. | 380/28 |
| 2010/0197367 | A1* | 8/2010 | Pattenden et al. | 455/572 |
| 2011/0010538 | A1* | 1/2011 | Falk et al. | 713/155 |
| 2011/0087884 | A1* | 4/2011 | Ho | 713/168 |
| 2011/0093714 | A1* | 4/2011 | Schaecher et al. | 713/176 |
| 2011/0107097 | A1* | 5/2011 | Braun et al. | 713/168 |
| 2011/0154043 | A1* | 6/2011 | Lim et al. | 713/172 |
| 2011/0314289 | A1* | 12/2011 | Horn et al. | 713/175 |
| 2012/0204238 | A1* | 8/2012 | Ittah et al. | 726/4 |
| 2012/0213361 | A1* | 8/2012 | Lim et al. | 380/44 |
| 2012/0213368 | A1* | 8/2012 | Falk | 380/270 |

OTHER PUBLICATIONS

Infineon Demonstrates Remote PC Peripherals Authentication Capability with ORIGA™ Authentication Chip Using Intel vPro Technology; Participates in Intel vPro Technology Community at IDF 2009; Sep. 22, 2009; http://www.infineon.com/cms/en/corporate/pressinews/releases/2009/INFIMM200909-083.html.

Stinson, D.R.; Wu, J.; "An Efficient and Secure Two-Flow Zero Knowledge Identification Protocol"; Oct. 12, 2006; http://eprint.iacr.org/2006/337.pdf.

Stinson, D.R.; Wu, J.; "An Efficient and Secure Two-Flow Zero Knowledge Identification Protocol"; Oct. 5, 2006; http://eprint.iacr.org/cgi-bin/print.pl.

Barker, E. et al.; "Recommendation for Pair-Wise Key Establishment Schemes Using Discrete Logarithm Cryptography"; NIST special Publication 800-56A; Mar. 2007.

Bodnar, K.; International Search Report from corresponding PCT Application No. PCT/CA2011/050411; search completed Oct. 21, 2011.

Menezes, A. et al.; "Handbook of Applied Cryptography"; Chapter 12 Key Establishment Protocols; 1996; CRC Press.

Manet, P.; Supplementary Search Report from corresponding European Application No. 11803053.5; search completed Sep. 29, 2014.

\* cited by examiner

SYSTEM AND METHOD FOR PERFORMING DEVICE AUTHENTICATION USING KEY AGREEMENT

CROSS-REFERENCE TO RELATED APPLICATIONS

This application claims priority from U.S. Provisional Application No. 61/362,604, filed on Jul. 8, 2010, the entire contents of which are incorporated herein by reference.

TECHNICAL FIELD

The following relates generally to device authentication and particularly to a system and method for performing device authentication using key agreement.

BACKGROUND

Devices that interact with other devices and those that accept replacement or otherwise changeable components or sub-devices may suffer from the detrimental effects of counterfeits. Counterfeit devices may pose safety hazards, risk liability to the device manufacturer, and displace genuine devices.

BRIEF DESCRIPTION OF THE DRAWINGS

Embodiments will now be described by way of example only with reference to the appended drawings wherein.

DETAILED DESCRIPTION OF THE DRAWINGS

In general terms, a method of performing device authentication is provided. The method includes a verification device participating in a key agreement protocol with an authentication device. The verification device obtains a first value from the authentication device, the first value having been generated by applying a deterministic function to a first result from a first operation performed in the key agreement protocol. The verification device uses the first value to authenticate the authentication device by performing a comparison of the first value with a second value, the second value generated by applying the deterministic function to a second result from a second operation performed in the key agreement protocol. The method may include the verification device obtaining a public key of the authentication device, the verification device validating a signature obtained from the authentication device, and the verification device accepting or rejecting the authentication device according to the comparison.

In another aspect, a method of enabling device authentication is provided. The method includes an authentication device participating in a key agreement protocol with a verification device. The authentication device generates a first value by applying a deterministic function to a first result from a first operation performed in the key agreement protocol. The authentication device provides the first value to the verification device, wherein the first value enables the verification device to perform device authentication by performing a comparison of the first value with a second value, the second value generated by applying the deterministic function to a second result from a second operation performed in the key agreement protocol. The method may include the authentication device providing a public key to the verification device, the authentication device providing a signature to be obtained by the verification device, and the authentication device applying one or more tests to a challenge point.

Genuine devices that are to be coupled to or integrated into another device, may be fitted with security devices containing a secret to be used to establish authenticity. Cryptographic authentication may use a 3-pass protocol, such as Fiat-shamir or GQ, where three messages are communicated. Other schemes may involve computing a signature on a challenge message, which reduces communication to two messages.

Figure 1:
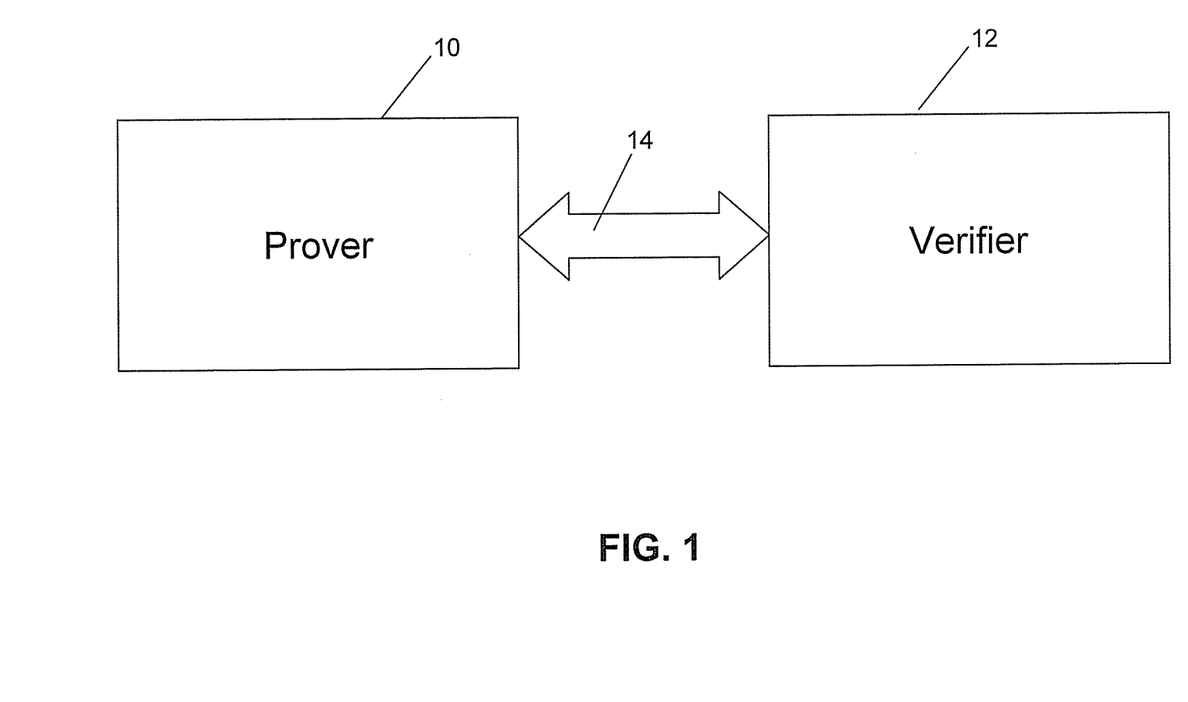
FIG. 1 is a block diagram of a prover and verifier communicatively connected via a connection or coupling.

Modules, devices, or components that are used to provide authentication for a genuine device are often constrained, by cost, to having relatively small computation power and limited functionality. It has been recognized therefore that elliptic curve cryptography (ECC) is particularly suitable to these "authentication modules". Turning first to FIG. 1, in systems that enable authentication, the device or component proving its valid identity is often referred to as the "prover" 10, and the device verifying the identity of the prover is often referred to as the "verifier" 12. For example, a device accepting a replaceable component may be considered the verifier 12 and the replaceable component itself the prover 10. The prover 10 and verifier 12 are typically coupled or otherwise communicatively connected or connectable to each other at least on a temporary basis via a connection 14 as shown in FIG. 1.

It has been found that the above-noted three pass schemes and schemes that utilize a signature both typically require the prover 10 to be able to generate local random values. It has also be recognized that binary curves can be considered very low-cost when used in an authentication module, given that they typically use arithmetic not requiring carries to be handled. However, EC signatures, such as the ECDSA (Elliptic Curve Digital Signature Algorithm) signature, involve the authentication module to also provide integer calculations, and modulo the point order, to generate the signature.

The following provides a configuration suitable to enable an authentication module for a prover 10 to utilize ECC while not requiring a random generator or anything more than the arithmetic required to perform EC scalar multiplication. In particular, when binary elliptic curves are employed, modular integer computation can be avoided by the authentication module.

In one embodiment described below, an authentication scheme is presented which employs an EC Diffie-Hellman key exchange (or other key agreement scheme), wherein the shared key is used as a protocol message in the authentication rather than being employed as a session key, which is the typical usage of a shared key. It can be appreciated that the principles equally apply to non-EC key agreement schemes.

Figure 2:
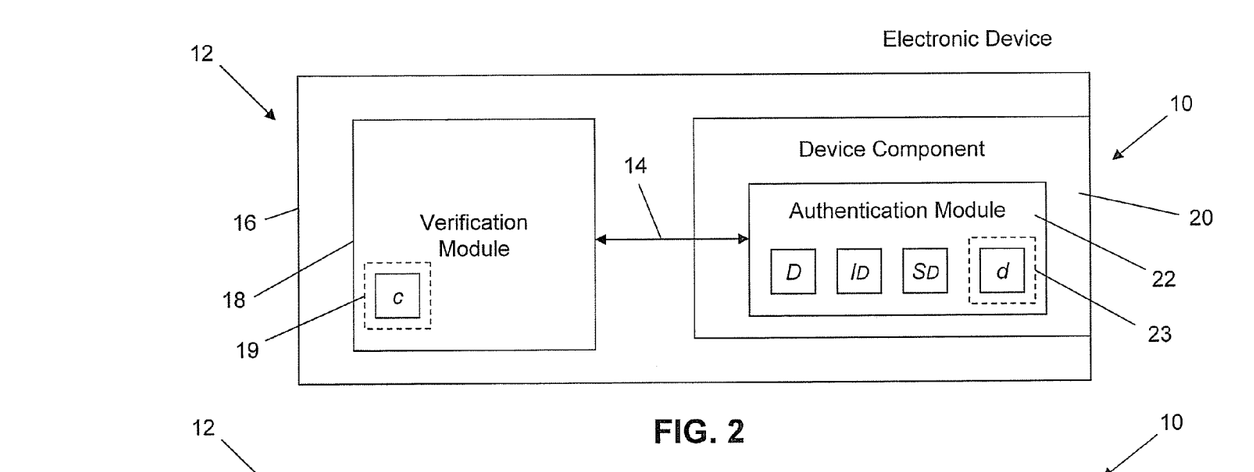
FIG. 2 is a block diagram of an example configuration of an electronic device comprising a device component to be authenticated.

Turning now to FIG. 2, one example configuration is shown, wherein the verifier 12 comprises an electronic device 16, which comprises a verification device or module 18 for verifying the identity of the prover 10. The verification module 18 comprises or otherwise has access to a secure portion of memory 19 for storing a private key c. The verification module 18 may comprise or be embodied as a cryptographic processor or device comprising software, hardware or a combination thereof, which software and/or hardware is/are capable of performing various cryptographic operations such as encryption, decryption, signature generation, signature verification, key establishment, key agreement, etc. The verification module 18 may also comprise or have access to memory for storing system parameters. In the examples provided below, the verification module 18 is particularly configured to perform EC operations although would not be limited to only EC functionality.

In this example configuration, the prover 10 comprises a device component 20 such as a battery, cartridge, or other replaceable part or component. The device component 20 comprises an authentication device or module 22, which comprises or otherwise has access to a secure portion of memory 23 for storing a private key d. The authentication module 22 may comprise or be embodied as a cryptographic processor or device comprising software, hardware or a combination thereof, which software and/or hardware is/are capable of performing various cryptographic operations such as encryption, decryption, signature generation, signature verification, key establishment, key agreement, etc. In the examples provided below, the authentication module 22 is particularly configured for performing EC operations although would not be limited to only EC functionality. As can also be seen in FIG. 2, the authentication module 22 is also configured to enable storage of various system parameters such as a public key D, identity information $I_D$, and a signature $S_D$ (which are shown for illustrative purposes), as well as a digital certificate (not shown) comprising a system signed ID and public key. It can be appreciated that other system parameters may also be stored. For the purposes of the following examples, the public key D corresponds to the private key d according to the relationship D=dG, on an elliptic curve, wherein G generates the group used for cryptographic operations. Also, the system parameters that are not stored within the secure boundary 23 are in some form readable by the verification module 18, e.g. by being accessible thereto via the connection 14.

Figure 3:
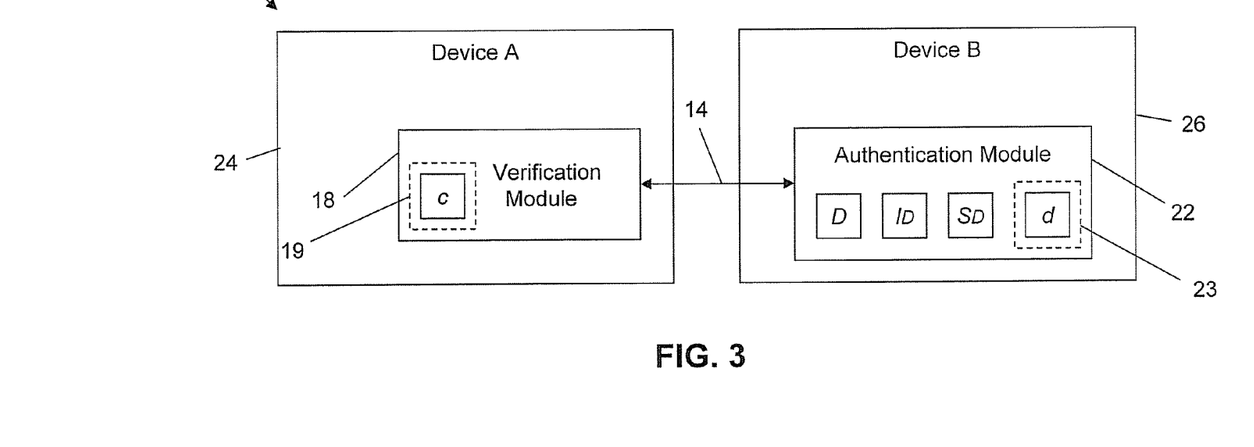
FIG. 3 is a block diagram of an example configuration of one device being authenticated to another device.

FIG. 3 illustrates another example configuration, wherein the prover 10 and verifier 12 are separate devices 24, 26 (also denoted Device A and Device B respectively) that are connectable or capable of being coupled via connection 14. It can be appreciated that the verification module 18 and authentication module 22 may be configured to operate in the manner described above, and thus the configuration shown in FIG. 3 is only to illustrate that many configurations involving the prover 10 and verifier 12 are possible within the principles discussed herein. It may also be appreciated that where separate devices 24, 26 are connectable as shown in FIG. 3, the connection 14 may be either secure or insecure with other cryptographic protections utilized, and may be a connection which is utilized by other components or sub-systems. It may also be appreciated that the devices 24, 26 may also be components of another device (not shown), may communicate via an intermediary (not shown), etc.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the verifier 10, prover 12, electronic devices 16, 24, 26, device component 20, verification module 18, authentication module 22 etc., or accessible or connectable thereto. Any application or module herein described may be implemented using computer readable/executable instructions that may be stored or otherwise held by such computer readable media.

Figure 4:
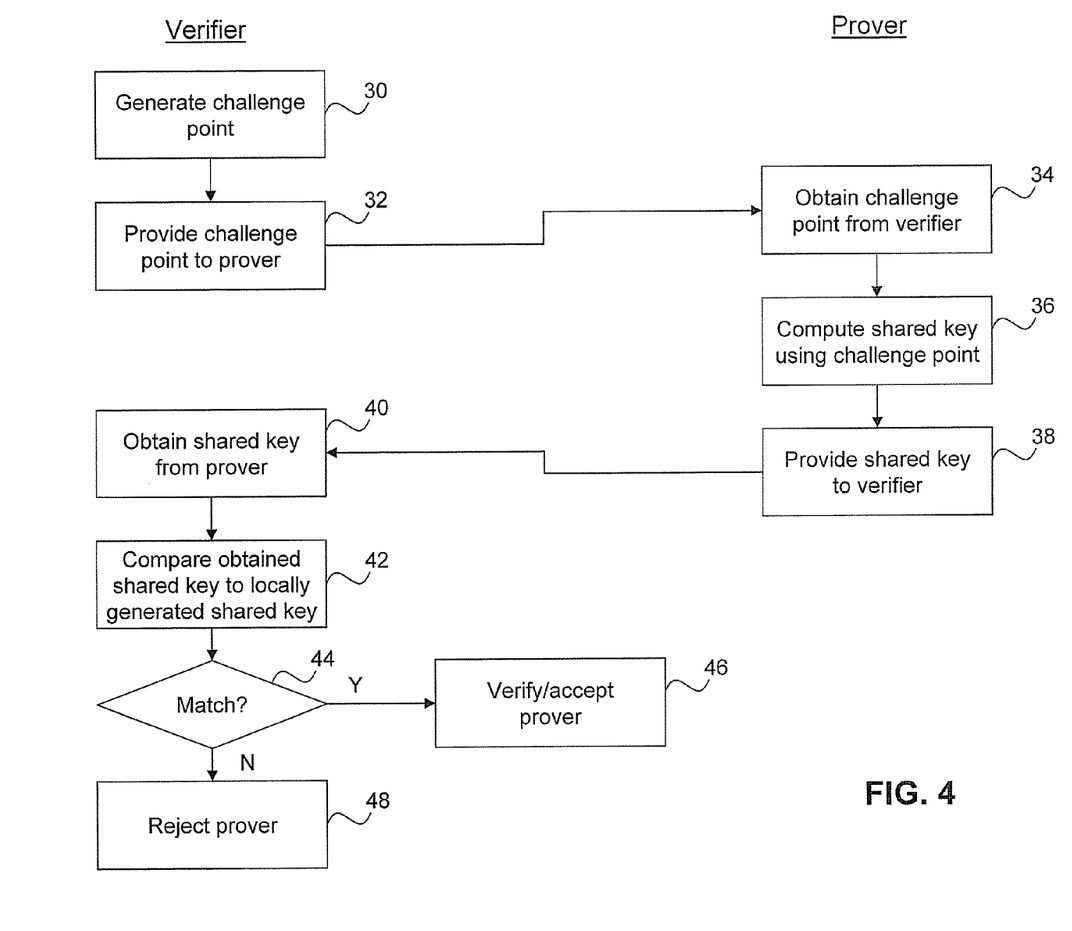
FIG. 4 is a flow chart illustrating an example set of computer executable instructions for a verifier accepting or rejecting a prover using a shared key.

Turning now to FIG. 4, an example set of computer executable operations is shown for enabling the verifier 12 to verify the identity of the prover 10. At 30, the verification module 18 generates a challenge point. The challenge point is then provided to the authentication module 22 at 32 and the authentication module 22 obtains the challenge point at 34. The authentication module 22 then computes a shared key using the challenge point at 36 and provides the shared key to the verification module 18 at 38. The verification module 18 obtains the shared key at 40 and compares the obtained shared key to one that has been generated locally in accordance with a particular key-agreement protocol at 42. If the obtained shared key matches the locally generated shared key at 44, the verification module 18 verifies the authentication module 22 and in turn the prover 10, and accepts the component or device associated therewith at 46. If the shared keys do not match at 44, the authentication module 22 and thus the prover 10 are rejected at 48.

It can be appreciated from the operations shown in FIG. 4 that contrary to traditional principles of key agreement, the shared key in this example is used as a protocol message, i.e. it is transmitted or otherwise provided by the prover 10 to the verifier 12 in order to enable the validity of the prover's identity to be confirmed. By using the agreed-upon-key, or a value derived from the agreed-upon-key, the authentication module 22 can avoid the extra complexity that may be required to perform a signature, which typically requires a source of randomness and modular integer computation. As will be shown by way of various examples below, various additional cryptographic operations may accompany the operations shown in FIG. 4, such as having the verification module 18 verify the signature $S_D$, having the authentication module 22 perform point validation techniques, using a cofactor, using deterministic functions, etc. Also, the operations shown in FIG. 4 may be repeated thus effecting multiple "rounds" of authentication. Additional rounds of validation may be performed to increase the level of confidence in the prover 10, especially in cases where the function ƒ( ) returns relatively few bits, and also to ensure the freshness of the prover 10 (i.e. that the proof is newly minted).

Figure 5:
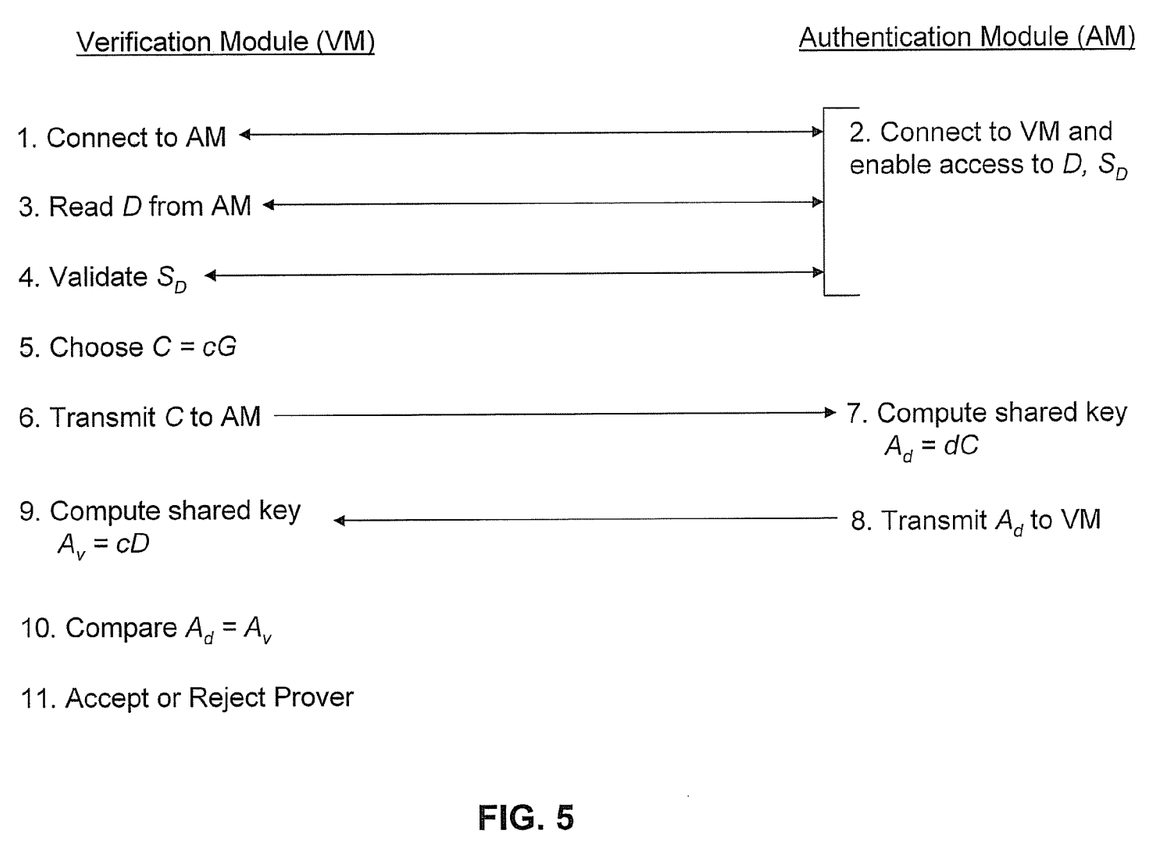
FIG. 5 is a flow chart illustrating an example set of computer executable instructions for a verifier accepting or rejecting a prover using a shared key according to a Diffie-Hellman protocol.

FIG. 5 illustrates an example embodiment for performing the operations shown in FIG. 4 by utilizing the principles of a Diffie-Hellman key agreement protocol. In this example, operation 1 comprises the verification module (VM) 18 connecting to the authentication module (AM) 22. At operation 2, the AM 22 also connects to the VM 18 or otherwise enables the VM 18 to read data stored thereon. The AM 22 thus enables the VM 18 to access the prover's public key D and the signature on the public key $S_D$. At operation 3, the VM 18 reads D from the AM 22 and at operation 4, validates the signature $S_D$. The VM 18 then chooses a challenge point C in operation 5, by computing the scalar multiplication C=cG wherein, as noted above. G is a generating point on the particular elliptic curve. The challenge point C is then transmitted to the AM 22 in operation 6. The AM 22 then computes a shared key $A_d$ dC using the received challenge point C in operation 7. Rather than using $A_d$ as a shared session key, as noted above, the AM 22 returns $A_d$ to the VM 18 in operation 8 as a protocol message.

The VM 18 also computes the shared key $A_v$=cD in operation 9, which should be equivalent to the received shared key $A_d$. It can be appreciated that operation 9 can be computed at any time once the VM 18 obtains the public key D and is only shown as operation 9 for illustrative purposes. Having received the shared key $A_d$ from the AM 22 and having locally computed the shared key $A_v$, the VM 18 then compares these values to determine if they are equivalent. This comparison may then be used to accept or reject the prover 10.

It can be appreciated that the scheme shown in FIG. 5 enables the AM 22 to prove its identity without requiring a random number generator. This can reduce the required computational complexity of the AM 22 and consequently the requisite cost. By using the shared key $A_D$ as a protocol message rather than a session key, the AM 22 can enable the VM 18 to verify it without requiring anything more than the performance of EC scalar multiplication (as well as various additional optional operations as will be shown by way of example below).

Figure 6:
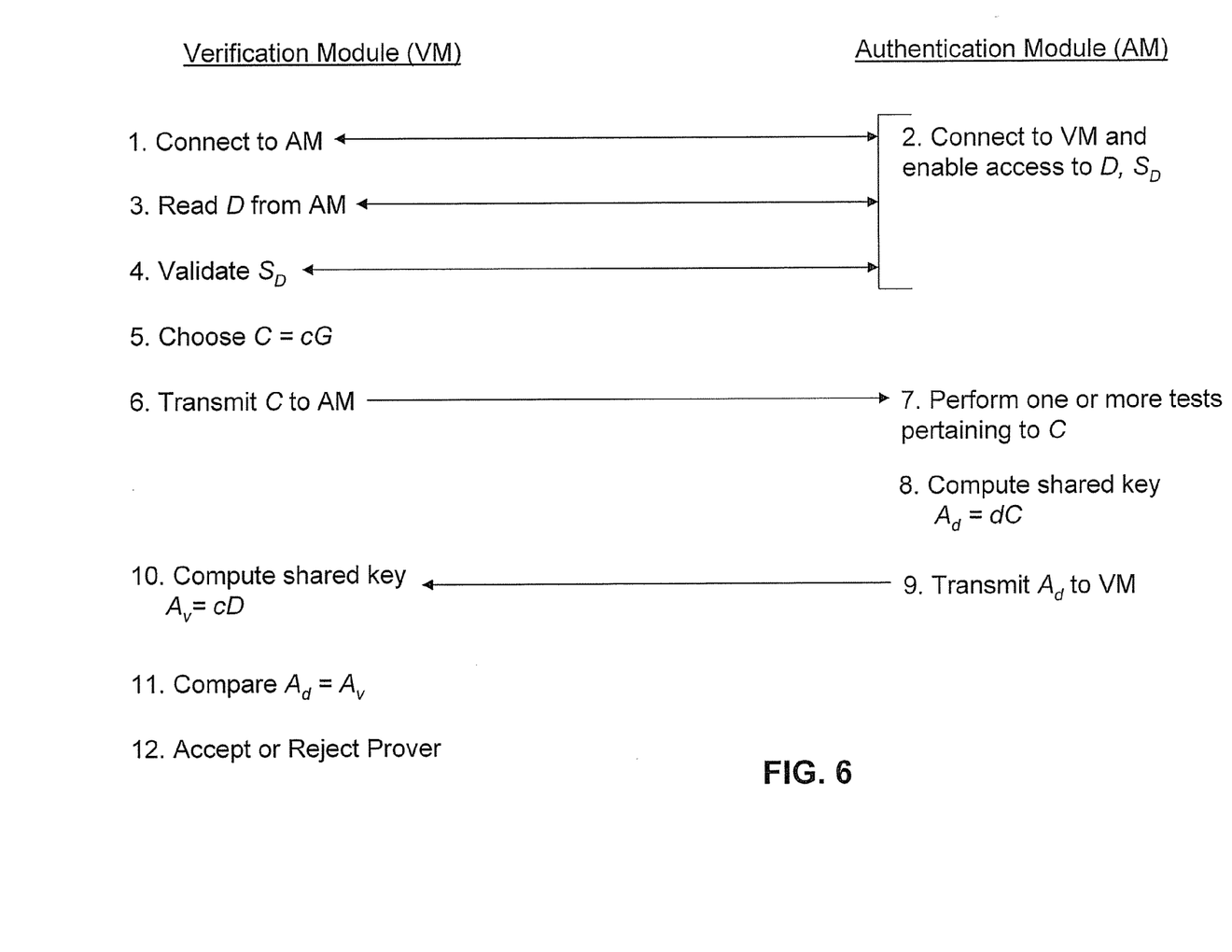
FIG. 6 is a flow chart illustrating an example set of computer executable instructions for a verifier accepting or rejecting a prover using a shared key and comprising one or more point validation operations.

FIG. 6 illustrates one embodiment wherein such additional optional operations may be performed by the AM 22. In FIG. 6, operations 1 through 6 are equivalent to operations 1 through 6 in FIG. 5 and thus details thereof will not be repeated. In this example, in operation 7, the AM 22 performs one or more tests pertaining to the challenge point C, such as checking that the challenge point C is on the working curve (defined by system parameters), and/or that C is in the large prime-order group on the curve which is generated by G. Any one or more of such tests may be performed in operation 7, for example any one or more of those tests described in co-owned U.S. Pat. Nos. 5,933,504; 6,563,928; 7,215,773; and 7,567,669; the contents of each of these patents being incorporated herein by reference. Assuming that the one or more tests performed in operation 7 are successful, operations 8 through 12 can proceed in a manner similar to operations 7 through 11 in FIG. 5 It can be appreciated that the point-related tests can be performed reusing the arithmetic already required for scalar multiplication. As such the tests may be performed at the same time as computing the shared key without overburdening the AM 22 with additional complexity.

Figure 7:
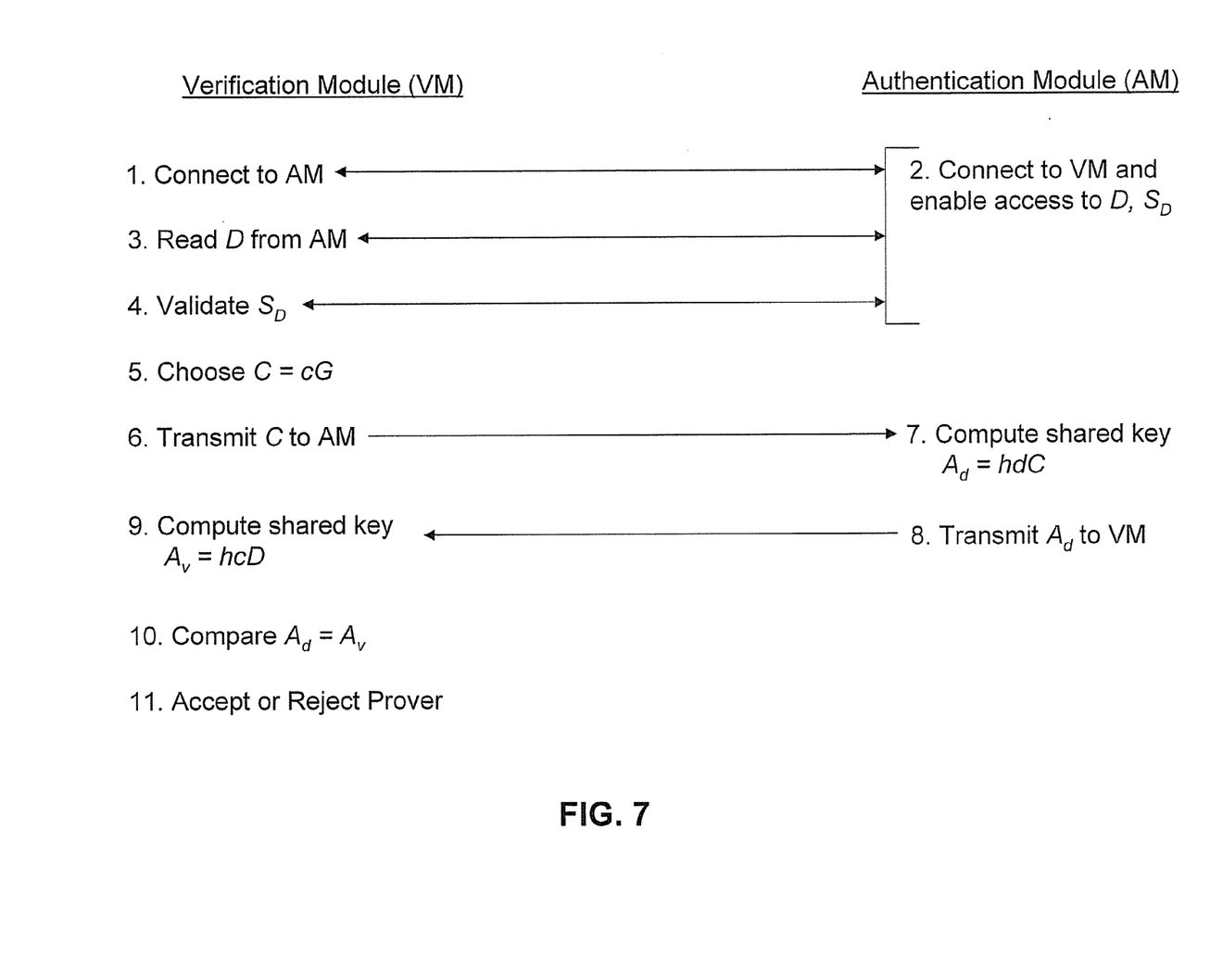
FIG. 7 is a flow chart illustrating an example set of computer executable instructions for a verifier accepting or rejecting a prover using a shared key comprising a co-factor.

Turning now to FIG. 7, the prover 10 may also have the AM 22 configured to compute the cofactor version of the Diffie-Hellman key agreement scheme shown in FIG. 5. As seen in FIG. 7, operation 7 comprises computing the session key $A_d$=hdC by incorporating the cofactor h into the computation. Accordingly, in operation 9, the VM 18 computes $A_v$=hcD to check for agreement in operation 10. In a configuration such as that shown in FIG. 7, the VM 18 may exclude the point at infinity from valid responses $A_d$ received from the AM 22.

It may be noted that the test(s) performed in FIG. 6 and the cofactor embodiment shown in FIG. 7 can avoid leakage of the prover's key bits when interacting with a dishonest verifier 12.

Figure 8:
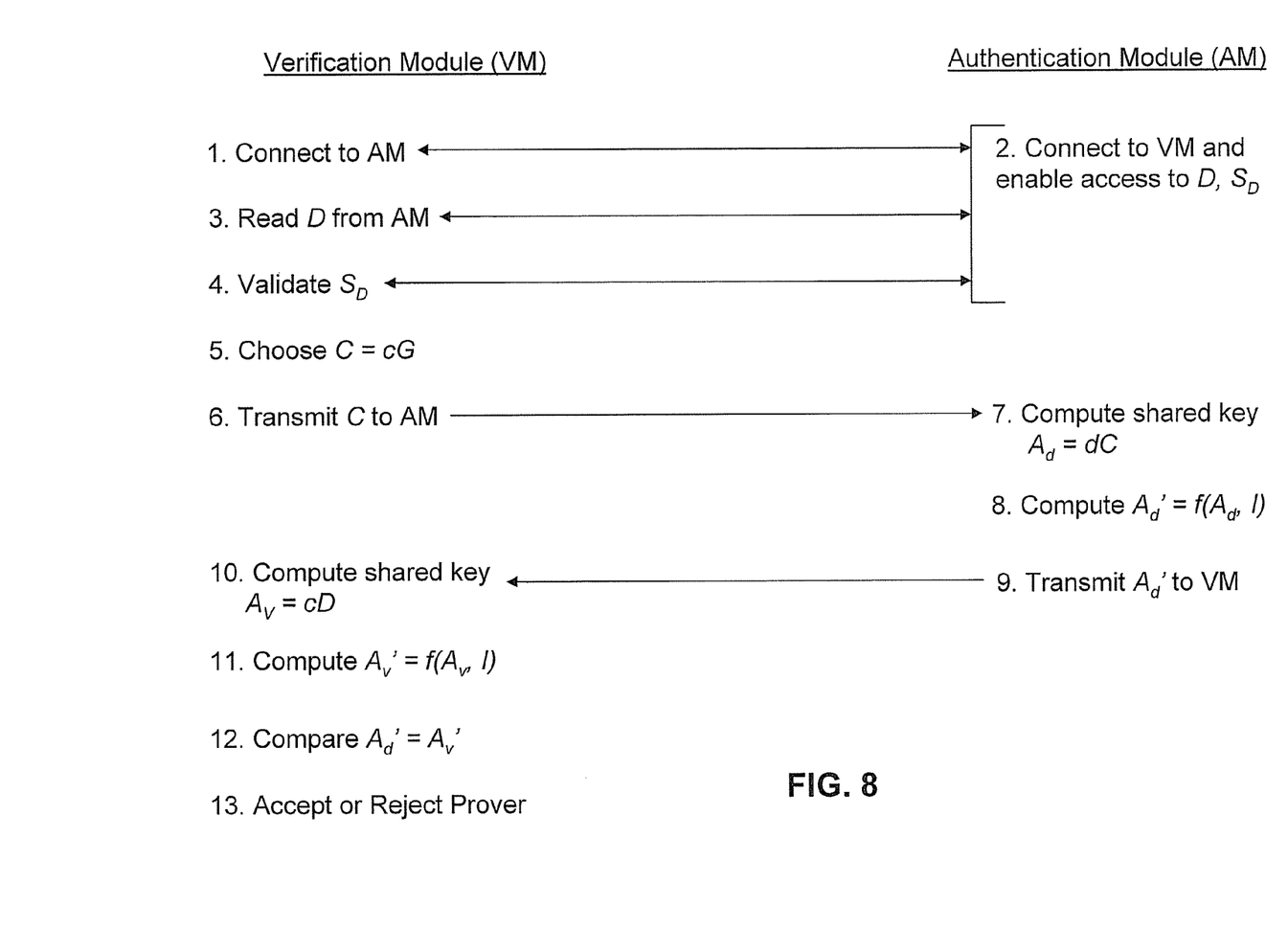
FIG. 8 is a flow chart illustrating an example set of computer executable instructions for a verifier accepting or rejecting a prover using a shared key subjected to a deterministic function.

As shown in FIG. 8, the VM 18 and AM 22 may also be configured to apply deterministic functions to the values $A_d$ and $A_v$. Operations 1 through 7 may proceed in the manner described above. In operation 8, however, the AM 22 applies a function ƒ( ), where ƒ( ) is an agreed upon deterministic function, to the value $A_d$ and information known to both parties I, namely by computing: $A_d'$=ƒ($A_d$, I). It can be appreciated that I may comprise public keys C, D, or information which the VM 18 has read from the AM 22 or a device associated therewith, and may contain $I_D$ as a component thereof. The value $A_d'$ is then transmitted in operation 9 rather than $A_d$, the VM 18 computes a value $A_v'$ using the same deterministic function ƒ( ), and the comparison performed in operation 12 is done using $A_d'$, and $A_v'$. It may be noted that the function ƒ( ) may output a reduced number of bits when compared to the number of bits given to its inputs.

Although shown separately in FIGS. 6 through 9, any two or more of the additional operations can be used at the same time. For example, the point-related tests may be performed prior to applying the cofactor and/or deterministic function.

Other key agreement methods, such as those outlined in X9.63 could be used as a basis for authentication, wherein the agreed-to key is used as a response to a challenge. For example, if the Elliptic Curve Menezes-Qu-Vanstone (EC-MQV) protocol is used as the key agreement scheme to be re-purposed for authentication, the verifier 18 having a long term public key V=vG also contributes a short term component C=cG, as above with a Diffie-Hellman protocol. The AM 22 would then contribute long term public key D, and short term public key B=bG (wherein B can be identical to D). Then, the AM 22 would return ƒ(MQV(V,C,D,B)), wherein MQV( ) is the function that is configured to return the agreed-upon-key as an authenticating value rather than as a key to be used in later stages. Other key-agreement schemes such as Station-To-Station (STS) schemes or MQV schemes, may be used in a similar way, wherein the agreed-upon-key is used as the authenticating value rather than a session or other key to be used later.

It may be appreciated that reference to any protocols or schemes or standards related thereto may include a standard previously in force, the standard currently in existence, and a standard that may be developed to improve, supplant, upgrade, or otherwise modify a standard that is already in effect.

Figure 9:
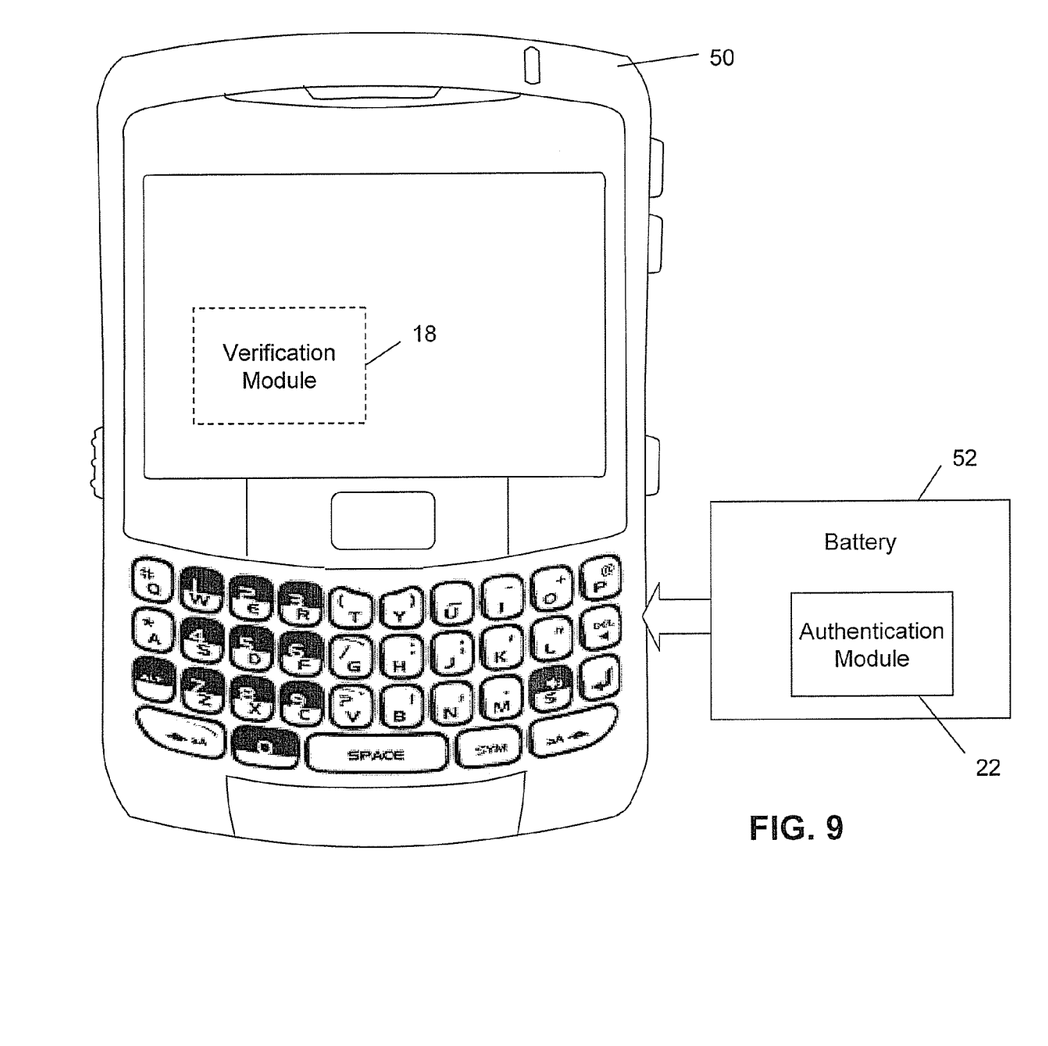
FIG. 9 is an external view of an example mobile device comprising a replaceable battery to be authenticated upon insertion thereof.

It can be appreciated that the above principles may be applied to any computational device and, for illustrative purposes, may be used in the context of mobile communication devices. One such example is shown in FIG. 9 wherein a mobile device 50 is configured to include a verification module 18 for verifying a component thereof, in this example a battery 52. The battery 52 comprises an authentication module 22 for proving it authenticity to the verification module 18, e.g. upon insertion, when powered up, etc.

For clarity in the discussion below, mobile communication devices are commonly referred to as "mobile devices 50" for brevity. Examples of applicable mobile devices 50 include without limitation, cellular phones, cellular smart-phones, wireless organizers, pagers, personal digital assistants, computers, laptops, handheld wireless communication devices, wirelessly enabled notebook computers, portable gaming devices, tablet computers, digital camera or imaging devices, or any other portable electronic device with processing and communication capabilities.

Figure 10:
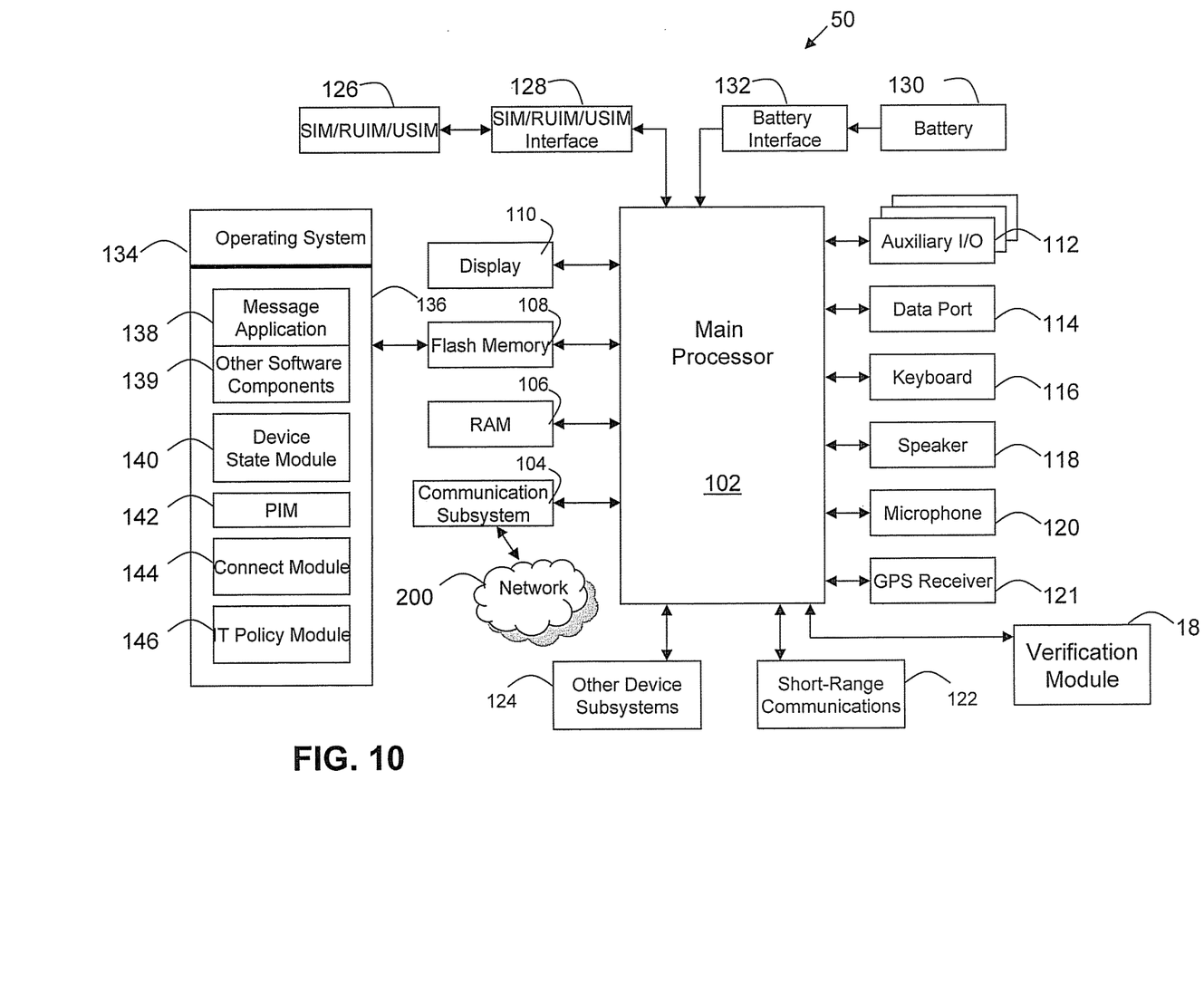
FIG. 10 is a block diagram of an example configuration for the mobile device of FIG. 9.

Referring now to FIG. 10, shown therein is a block diagram of an exemplary embodiment of a mobile device 50. The mobile device 50 comprises a number of components such as a main processor 102 that controls the overall operation of the mobile device 50. Communication functions, including data and voice communications, are performed through a communication subsystem 24. The communication subsystem 24 receives messages from and sends messages to a wireless network 200. In this example embodiment of the mobile device 50, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 24 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, GPS receiver 121, short-range communications 122 and other device subsystems 124. FIG. 10 also illustrates the inclusion of a verification module 18, which in this example may communicate with the main processor 102.

Some of the subsystems of the mobile device 50 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 50 can send and receive communication signals over the wireless network 200 after required network registration or activation procedures have been completed. Network access is associated with a subscriber or user of the mobile device 50. To identify a subscriber, the mobile device 50 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 50 and to personalize the mobile device 50, among other things. Without the component 126, the mobile device 50 may not be fully operational for communication with the wireless network 200. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 50 is typically a battery-powered device and includes a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 50. Although current technology makes use of a battery, future technologies such as micro fuel cells may provide the power to the mobile device 50.

The mobile device 50 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 50 during its manufacture. Other software applications include a message application 138 that can be any suitable software program that allows a user of the mobile device 50 to send and receive electronic messages. Various alternatives exist for the message application 138 as is well known to those skilled in the art. Messages that have been sent or received by the user are typically stored in the flash memory 108 of the mobile device 50 or some other suitable storage element in the mobile device 50. In at least some embodiments, some of the sent and received messages may be stored remotely from the mobile device 50 such as in a data store of an associated host system that the mobile device 50 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 50 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 50 with respect to such items. This can be particularly advantageous when the host computer system is the mobile device subscriber's office computer system.

The mobile device 50 may also comprise a connect module 144, and an IT policy module 146. The connect module 144 implements the communication protocols that are required for the mobile device 50 to communicate with the wireless infrastructure and any host system, such as an enterprise system, that the mobile device 50 is authorized to interface with.

The connect module 144 includes a set of APIs that can be integrated with the mobile device 50 to allow the mobile device 50 to use any number of services associated with the enterprise system. The connect module 144 allows the mobile device 50 to establish an end-to-end secure, authenticated communication pipe with a host system (not shown). A subset of applications for which access is provided by the connect module 144 can be used to pass IT policy commands from the host system to the mobile device 50. This can be done in a wireless or wired manner. These instructions can then be passed to the IT policy module 146 to modify the configuration of the mobile device 50. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 50. Applications for which the IT policy may be applicable then respond by reading the IT policy data to look for IT policy rules that are applicable.

Other types of software applications or components 139 can also be installed on the mobile device 50. These software applications 139 can be pre-installed applications (i.e. other than message application 138) or third party applications, which are added after the manufacture of the mobile device 50. Examples of third party applications include games, calculators, utilities, etc.

The additional applications 139 can be loaded onto the mobile device 50 through at least one of the wireless network 200, the auxiliary I/O subsystem 112, the data port 114, the short-range communications subsystem 122, or any other suitable device subsystem 124. This flexibility in application installation increases the functionality of the mobile device 50 and may provide enhanced on-device functions, communication-related functions, or both. For example, secure communication applications may enable electronic commerce functions and other such financial transactions to be performed using the mobile device 50.

The data port 114 enables a subscriber to set preferences through an external device or software application and extends the capabilities of the mobile device 50 by providing for information or software downloads to the mobile device 50 other than through a wireless communication network. The alternate download path may, for example, be used to load an encryption key onto the mobile device 50 through a direct and thus reliable and trusted connection to provide secure device communication.

The data port 114 can be any suitable port that enables data communication between the mobile device 50 and another computing device. The data port 114 can be a serial or a parallel port. In some instances, the data port 114 can be a USB port that includes data lines for data transfer and a supply line that can provide a charging current to charge the battery 130 of the mobile device 50.

The short-range communications subsystem 122 provides for communication between the mobile device 50 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 200 through the communication subsystem 104.

For voice communications, the overall operation of the mobile device 50 in this example is substantially similar, except that the received signals are output to the speaker 118, and signals for transmission are generated by the microphone 120. Alternative voice or audio I/O subsystems, such as a voice message recording subsystem, can also be implemented on the mobile device 50. Although voice or audio signal output is accomplished primarily through the speaker 118, the display 110 can also be used to provide additional information such as the identity of a calling party, duration of a voice call, or other voice call related information.

In general there may be provided a method of performing device authentication, the method comprising: participating in a key agreement protocol with an authentication device; obtaining a first value from a device being authenticated, the first value having been generated using a result from an operation performed in the key agreement protocol; and using the first value to authenticate the device by performing a comparison of the first value with a second value.

There may also be provided a computer readable medium comprising computer executable instructions for performing device authentication, the computer readable medium comprising instructions for: a verification device participating in a key agreement protocol with an authentication device; the verification device obtaining a first value from the authentication device, the first value having been generated using a result from an operation performed in the key agreement protocol; and the verification device using the first value to authenticate the device by performing a comparison of the first value with a second value.

There may also be provided a verification device comprising a processor and memory, the processor configured for performing device authentication, the memory storing computer executable instructions for: participating in a key agreement protocol with an authentication device; obtaining a first value from the authentication device, the first value having been generated using a result from an operation performed in the key agreement protocol; and using the first value to authenticate the device by performing a comparison of the first value with a second value.

There may also be provided a method of enabling device authentication, the method comprising: participating in a key agreement protocol; generating a first value using a result from an operation performed in the key agreement protocol; and providing the first value to a verifier, wherein the first value enables the verifier to perform device authentication by performing a comparison of the first value with a second value generated by the verifier.

There may also be provided a computer readable medium comprising computer executable instructions for performing device authentication, the computer readable medium comprising instructions for: an authentication device participating in a key agreement protocol with a verification device; the authentication device generating a first value using a result from an operation performed in the key agreement protocol; and the authentication device providing the first value to the verification device, wherein the first value enables the verification device to perform device authentication by performing a comparison of the first value with a second value generated by the verification device.

There may also be provided an authentication device comprising a processor and memory, the processor configured for enabling device authentication, the memory storing computer executable instructions for: participating in a key agreement protocol with a verification device; generating a first value using a result from an operation performed in the key agreement protocol; and providing the first value to the verification device, wherein the first value enables the verification device to perform device authentication by performing a comparison of the first value with a second value generated by the verification device.

Although the above has been described with reference to certain specific embodiments, various modifications thereof will be apparent to those skilled in the art without departing from the scope of the claims appended hereto.

The invention claimed is:

1. A method of performing device authentication of a component of a verification device, the method comprising:
    the verification device participating in an elliptic curve key agreement protocol with the component comprising the verification device computing a challenge point on an elliptic curve by performing scalar multiplication using a private key of the verification device and a generating point, and providing the challenge point to the component;
    the verification device obtaining a first value from the component, the first value having been generated by the component by applying a deterministic function to a first result from a first operation performed in the key agreement protocol, the component participating in the key agreement protocol without using a random number generator, the first result having been computed using the challenge point, a cofactor and a private key of the component; and
    the verification device using the first value to authenticate the component by performing a comparison of the first value with a second value, the second value generated by applying the deterministic function to a second result from a second operation performed in the key agreement protocol, the second result being computed using the cofactor, the private key of the verification device and a public key of the component.

2. The method according to claim 1, wherein the first and second results correspond to an agreed-upon-key.

3. The method according to claim 1, wherein the deterministic function uses information known to the verification device and the component.

4. The method according to claim 1, wherein the deterministic function uses identity information of the component.

5. The method according to claim 1, wherein the deterministic function generates an output based on one or more inputs, the output having a number of bits, each input having a respective number of bits, the number of bits of the output being less than the respective number of bits of one or more inputs.

6. The method according to claim 1, further comprising the verification device obtaining the public key of the component.

7. The method according to claim 1, further comprising the verification device validating a signature obtained from the component.

8. The method according to claim 1, further comprising the verification device accepting or rejecting the component according to the comparison.

9. The method according to claim 1, wherein the key agreement protocol comprises any one of a Diffie-Hellman protocol, an MQV protocol, and a STS protocol.

10. A non-transitory computer readable medium comprising computer executable instructions for performing device authentication of a component of a verification device, the computer readable medium comprising instructions for:
    the verification device participating in an elliptic curve key agreement protocol with the component comprising the verification device computing a challenge point on an elliptic curve by performing scalar multiplication using a private key of the verification device and a generating point, and providing the challenge point to the component;
    the verification device obtaining a first value from the component, the first value having been generated by the component by applying a deterministic function to a first result from a first operation performed in the key agreement protocol, the component participating in the key agreement protocol without using a random number generator, the first result having been computed using the challenge point, a cofactor and a private key of the component; and
    the verification device using the first value to authenticate the component by performing a comparison of the first value with a second value, the second value generated by applying the deterministic function to a second result from a second operation performed in the key agreement protocol, the second result being computed using the cofactor, the private key of the verification device and a public key of the component.

11. A verification device comprising a processor and memory, the processor configured for performing device authentication of a component of the verification device, the memory storing computer executable instructions for:
    participating in an elliptic curve key agreement protocol with the component comprising the verification device computing a challenge point on an elliptic curve by performing scalar multiplication using a private key of the verification device and a generating point, and providing the challenge point to the component;
    obtaining a first value from the component, the first value having been generated by the component by applying a deterministic function to a first result from a first operation performed in the key agreement protocol, the component participating in the key agreement protocol without using a random number generator, the first result having been computed using the challenge point, a cofactor and a private key of the component; and using the first value to authenticate the component by performing a comparison of the first value with a second value, the second value generated by applying the deterministic function to a second result from a second operation performed in the key agreement protocol, the second result being computed using the cofactor, the private key of the verification device and a public key of the component.

12. A method of enabling device authentication of a component of a verification device, the method comprising:

the component participating in an elliptic curve key agreement protocol with the verification device comprising the component obtaining a challenge point on an elliptic curve from the verification device, the challenge point having been computed by performing scalar multiplication using a private key of the verification device and a generating point;

the component generating a first value by applying a deterministic function to a first result from a first operation performed in the key agreement protocol, the component participating in the key agreement protocol without using a random number generator, the component computing the first result using the challenge point, a cofactor and a private key of the component; and the component providing the first value to the verification device, wherein the first value enables the verification device to perform device authentication by performing a comparison of the first value with a second value, the second value generated by applying the deterministic function to a second result from a second operation performed in the key agreement protocol, the second result being computed using the cofactor, the private key of the verification device and a public key of the component.

13. The method according to claim 12, wherein the first and second results correspond to an agreed-upon-key.

14. The method according to claim 12, wherein the deterministic function uses information known to the verification device and the component.

15. The method according to claim 12, wherein the deterministic function uses identity information of the component.

16. The method according to claim 12, wherein the deterministic function generates an output based on one or more inputs, the output having a number of bits, each input having a respective number of bits, the number of bits of the output being less than the respective number of bits of one or more inputs.

17. The method according to claim 12, further comprising the component providing the public key to the verification device.

18. The method according to claim 12, further comprising the component providing a signature to be obtained by the verification device.

19. The method according to claim 12, wherein the key agreement protocol comprises any one of a Diffie-Hellman protocol, an MQV protocol, and a STS protocol.

20. The method according to claim 12, further comprising the component applying one or more tests to the challenge point.

21. The method according to claim 20, wherein the one or more tests comprise any one or more of checking the challenge point is on an elliptic curve being used in the key agreement protocol, and checking that the challenge point is in a large prime sub-order group on the elliptic curve.

22. A non-transitory computer readable medium comprising computer executable instructions for performing device authentication of a component of a verification device, the computer readable medium comprising instructions for:

the component participating in an elliptic curve key agreement protocol with the verification device comprising the component obtaining a challenge point on an elliptic curve from the verification device, the challenge point having been computed by performing scalar multiplication using a private key of the verification device and a generating point;

the component generating a first value by applying a deterministic function to a first result from a first operation performed in the key agreement protocol, the component participating in the key agreement protocol without using a random number generator, the component computing the first result using the challenge point, a cofactor and a private key of the component; and the component providing the first value to the verification device, wherein the first value enables the verification device to perform device authentication by performing a comparison of the first value with a second value, the second value generated by applying the deterministic function to a second result from a second operation performed in the key agreement protocol, the second result being computed using the cofactor, the private key of the verification device and a public key of the component.

23. A component of a verification device, the component comprising a processor and memory, the processor configured for enabling device authentication of the component by the verification device, the memory storing computer executable instructions for:

participating in an elliptic curve key agreement protocol with the verification device comprising the component obtaining a challenge point on an elliptic curve from the verification device, the challenge point having been computed by performing scalar multiplication using a private key of the verification device and a generating point;

generating a first value by applying a deterministic function to a first result from a first operation performed in the key agreement protocol, the component participating in the key agreement protocol without using a random number generator, the component computing the first result using the challenge point, a cofactor and a private key of the component; and providing the first value to the verification device, wherein the first value enables the verification device to perform device authentication by performing a comparison of the first value with a second value, the second value generated by applying the deterministic function to a second result from a second operation performed in the key agreement protocol, the second result being computed using the cofactor, the private key of the verification device and a public key of the component.

* * * * *